United States Patent [19]

Vaughan

[11] Patent Number: 4,524,179

[45] Date of Patent: Jun. 18, 1985

[54] POLYPHENYLENE ETHER COMPOSITIONS HAVING IMPROVED PROCESSABILITY

[75] Inventor: James M. Vaughan, Williamstown, W. Va.

[73] Assignee: Borg-Warner Chemicals, Inc., Parkersburg, W. Va.

[21] Appl. No.: 643,939

[22] Filed: Aug. 24, 1984

[51] Int. Cl.³ .................. C08L 71/02; C08L 71/04
[52] U.S. Cl. ........................ 525/68; 525/132; 525/396; 525/905
[58] Field of Search ............. 525/68, 396, 132, 905

[56] References Cited

U.S. PATENT DOCUMENTS 3,631,126  12/1971  Snodgrass et al. ............ 525/396
4,410,654  10/1983  Brandstetter et al. ......... 524/487
4,433,088   2/1984  Haaf et al. .................. 524/153

Primary Examiner—Jacob Ziegler
Attorney, Agent, or Firm—Richard J. Schlott

[57] ABSTRACT

Compositions comprising polyphenylene ether resins and high impact polystyrene resins exhibit improved processability and reduced adhesion to heated metal surfaces when a minor but effective amount of an ethylene oxide-propylene oxide copolymer is included therein.

3 Claims, No Drawings

POLYPHENYLENE ETHER COMPOSITIONS HAVING IMPROVED PROCESSABILITY

BACKGROUND OF THE INVENTION

This invention relates to polyphenylene ether (PPE) blends having improved processability and reduced adhesion is metal surfaces, and more particularly to a method for improving the processibility of PPE blend compositions.

Polyphenylene ether (PPE) resins and particularly PPO, or poly(2,6-dimethyl-1,4-phenylene ether), have long been known as high temperature thermoplastics. These resins are typically prepared by the oxidative coupling of a monohydric phenol such as 2,6-dimethyl phenol, as taught for example in U.S. Pat. Nos. 3,134,753 and 3,306,874. PPE resins soften or melt only at very high temperatures, normally well above 500° F., which may exceed the upper limit of thermal stability for such materials. The resins also exhibit a very high melt viscosity, and are very difficult to melt process in conventional processing equipment without substantial thermal degradation. Commonly, the resins are blended with lower melt temperature resins to improve their melt processability and to achieve commercially acceptable molding characteristics. For example, polyphenylene ether resins may be blended with styrenic resins as is disclosed in U.S. Pat. Nos. 3,356,761 and 3,383,435 or with polyolefins such as polyethylene as described in U.S. Pat. No. 3,361,851 to achieve improved processabiity.

More recently, in U.S. Pat. No. 4,038,543, there were disclosed phenylene ether copolymer resins (PEC) having improved thermal resistance, high temperature oxidative stability and resistance to heat aging. These resins, copolymers of 2,6-dialkyl phenols and 2,3,6-trialkyl phenols containing up to 50 wt% of the trialkyl monomer component, are more stable at the melt processing temperature, but exhibit a high melt viscosity and are also difficult to melt process alone. Blending these copolymers with other resins such as styrenic polymers is therefore desirable to achieve adequate processability and a useful balance of mechanical properties for commercial molding applications.

Although combining polyphenylene ether resins or phenylene ether copolymer resins with styrenic resins achieves an improvement in processability and when further formulated produces molding resins with a useful balance of mechanical properties, such blends generally require the further addition of processing aids to achieve practical thermal processability characteristics in molding and extrusion equipment. For example, polyolefins have long been added to such compositions as processing aids, and the use of hydrocarbon waxes to improve melt flow is disclosed in U.S. Pat. No. 4,410,654. The mold release characteristics of such compositions are also said to be good when a minor amount of a low molecular weight polyamide or alkylene glycol is substituted for the polyolefin, according to U.S. Pat. No. 4,433,088.

The use of polyolefins, hydrocarbon waxes, amides and other such processing aids has been successful in providing processable blends. However, when used at levels sufficient to improve processing without significantly lowering the heat distortion temperature characteristics of these blends, the resulting formulations exhibit an undesirable degree of adhesion to hot metal surfaces and sticking to the surfaces of dies, molds and the like. A reduction in mold-sticking characteristics has heretofore been accomplished by further increasing the level of the processing aid, thereby reducing the heat distortion characteristics of the blend.

SUMMARY OF THE INVENTION

This invention is a composition having improved processability and reduced mold-sticking characteristics, and a method for improving the processing characteristics of compositions comprising a polyphenylene ether resin and a polystyrene. The improvement is accomplished by including a minor amount of a block copolymer of ethyelene oxide and propylene oxide sufficient to provide improved processability and reduce adhesion to hot metal surfaces such as the surfaces of heated molds, extrusion dies, and the flights of screw injection molding machines and extruders. The addition of as little as 0.5 parts by weight of the copolymer to such compositions effects a substantial improvement in processability without deleteriously affecting the physical properties and particularly the heat distortion characteristics of the molded article. The compositions may further comprise conventional processing aids such as polyolefins and the like.

DETAILED DESCRIPTION OF THE INVENTION

The PPE blend compositions which are improved according to the teachings of this invention comprise from 5 to 95 wt% of a phenylene ether resin (PPE) and from 95 to 5 wt% of an styrenic resin. The improved compositions may further comprise polyolefins, impact modifiers, plasticizers and stabilizers as conventionally practiced in the compounding art.

The phenylene ether resins useful for the purpose of this invention are, in general, polymers of a 2,6-dialkyl phenol such as for example 2,6-dimethyl phenol, and copolymers thereof with a 2,3,6-trialkyl phenol such as for example 2,3,6-trimethyl phenol. The proportion of 2,3,6-triaklyl phenol in such copolymers will lie in the range of from about 2 to 50 wt% based on total phenylene ether copolymer. However, the preferred copolymers will comprise from about 2 to 20, more preferably from about 2 to about 10 wt% 2,3,6-trialkyl phenol and correspondingly from about 98 to about 80, more preferably from about 98 to about 90 wt% 2,6-dialkyl phenol. The synthesis of these resins from the corresponding phenols by an oxidative coupling process is well known and is well described and set forth in the art, for example in U.S. Pat. No. 4,011,200.

The styrenic resins useful in the practice of this invention include the homopolymers of styrene, vinyl toluene, chlorostyrene, bromostyrene and the like as well as copolymers thereof, and high impact or HIPS versions thereof, which commonly include graft copolymers of said monomers on rubbery substrates and blends of said homopolymers or copolymers with rubbery impact modifiers. A great variety of these styrenic resins are readily available commercially.

Blends of PPE homopolymer and copolymer resins with styrenic resins are widely available commercially, and include the Noryl ® resins sold commercially by the General Electric Company and Prevex TM resins sold by Borg-Warner Chemicals, Inc. As sold, these commercial blends are formulated with plasticizers, pigments, flame retardants, lubricants, stabilizers and the like such as aromatic phosphates, polyolefins, phosphites, phenolic stabilizers, ans so forth.

The ethylene oxide-propylene oxide block copolymers useful in the practice of this invention, are also readily available from commercial sources. The block copolymers and ethylene oxide and propylene oxide having from 20 to 90 wt% ethylene oxide and a molecular weight of from 2,000 to 10,000 are generally prepared in a controlled, caustic-initiated polymerization of the two monomers to provide well-defined homopolymeric sequences of the ethylene oxide component and the propylene oxide component. These block copolymers may thus be tailored to provide particularly desired physical characteristics such as hydrophilicity, crystallinity, melting point and the like. Such block copolymers are widely recognized in the art as a distinct class of ether copolymers, quite different in physical properties from random copolymers of the two components or homopolymers of either component alone. Such materials are widely sold under a variety of trade names including the Pluronic ® series of surfactants sold by Wyandotte Chemical Co., and the Pegol TM series of surfactants sold by Borg-Warner Chemicals, Inc.

The compositions of this invention will comprise from 0.01 to 2.0 parts by weight of the ethylene oxide-propylene oxide block copolymer per hundred parts by weight of the PPE resin-styrenic resin blend. Although the beneficial effects of the additive will be apparent at any level of additive, at very low levels the effect on mold-sticking will be small and possibly of little real benefit, while at levels much above about 1.0 pbw an undesirable degree of depression of the HDT value for the blend will be noted. For practical reasons, the most preferred level will be in the range of from about 0.1 to about 0.75 pbw. These blend compositions may be prepared by any of a variety of methods well known in the polymer art. For example, an intimate mixture of the powdered resins and the ethylene oxide-propylene oxide block copolymer may be prepared by dry-blending or by thermally-processing in a melt-mixing device such as a Banbury mixer or a heated roll-mill, or by feeding the mixed components to a single or twin-screw extruder at an elevated temperature of from about 450° to 600° F. The resulting resin blend may then be chopped or ground into particles and molded, for example by use of a ram or screw-fed injection molding machine. The extrusion and molding of the improved resins of this invention is accomplished readily and with less troublesome die-sticking and mold-sticking problems, as compared with conventional PPE-styrenic resin formulations.

The practice of this invention will be better understood by consideration of the following examples. These examples are not offered in limitation of the invention but rather in illustration of preferred embodiments.

EXAMPLE 1

A powdered commercial polyphenylene ether-high impact styrene resin blend formulation, obtained as Prevex TM VF1 resin from Borg-Warner Chemicals, Inc., was melt compounded with 0.5 pbw ethylene oxide-propylene oxide polymer obtained as Peol F88 grade from Borg-Warner Chemicals, Inc. and then extruded in a Warner Pfleiderer twin-screw extruder at 600° F. The extrudate, in the form of pellets, was then melt-pressed between two ferrotype plates at 500° F. in a heated-platen hydraulic press for 20 sec. at 30,000 psi. The plates were removed from the press and chilled in a water bath for about 10 sec. The plates were easily separated to provide a pressed disc of the resin.

As a control, the Prevex VF1 grade resin, extruded as before, was pressed between ferrotype plates without being first compounded with F88. The plate could not be separated by twisting, prying with screw drivers or pulling with vice-grip type pliers.

Prevex TM VF1 grade resin comprises 50 wt% phenylene ether resin, 45 wt% high impact styrene resin, and approximately by 1 wt% polyolefin, based on total polymeric components, together with impact modifiers, stabilizers, an aromatic phosphate and pigments.

EXAMPLES 2-11

Blends of PQA grade and BJA grade Prevex TM resins were prepared by mixing the powdered resins with varying levels of processing aids, extruding into pellets as in Example 1, then injection molding the pellets to form test specimens. The physical properties of these blends are summarized in Table I.

PQA and BJA grades of Prevex resins include the same components as the VF1 grade of Example 1, but in different proportions. Both grades include greater than 0.5 pbw polyolefin.

Control blends without F88 are included as Control Examples A and B.

EBS wax, or ethylene bis stearamide, an amide-type additive commonly used as a processing aid for resins, was also compounded with these resins in place of the F88 to provide comparison Examples 5, 6, 10 and 11.

TABLE I

| Ex No: | A | 2 | 3 | 4 | 5 | 6 |
|---|---|---|---|---|---|---|
| Resin[1] | PQA | PQA | PQA | PQA | PQA | PQA |
| Additive | — | F88 | F88 | F88 | EBS | EBS |
| pbw | — | 0.25 | 0.50 | 1.0 | 0.5 | 1.0 |
| HDT, °F. | 237 | 236 | 236 | 236 | 236 | 231 |
| Izod Impact | 3.8 | 3.9 | 3.7 | 4.0 | 3.8 | 3.8 |
| Tens Str psi | 7435 | 7335 | 7520 | 7510 | 7715 | 7525 |
| E % | 50 | 38 | 43 | 37 | 39 | 30 |

| Ex No: | B | 7 | 8 | 9 | 10 | 11 |
|---|---|---|---|---|---|---|
| Resin[1] | BJA | BJA | BJA | BJA | BJA | BJA |
| Additive | — | F88 | F88 | F88 | EBS | EBS |
| pbw | — | 0.25 | 0.5 | 1.0 | 0.5 | 1.0 |
| HDT, °F. | 185 | 183 | 181 | 181 | 180 | 173 |
| Izod Impact | 5.1 | 5.5 | 6.1 | 6.5 | 5.8 | 5.8 |
| Tens Str psi | 6115 | 6050 | 5980 | 6090 | 6360 | 6205 |
| E % | 45 | 47 | 38 | 50 | 48 | 43 |

Notes:
[1]PQA and BJA are grades of Prevex TM resin. See test. F88 is Pegol TM F88 grade ethylene oxide - propylene oxide block copolymer resin. See text.

It will be apparent that the addition of F88 has little effect on the physical properties of phenylene ether blends, with only minimal lowering of HDT value at a level of 1.0 pbw. The effect on processability, however, is great. The blend of Example 3, in a production run in an extruder, was processed continuously for three hours without difficulty. The blend of Control A, containing no F88, produced substantial particle build-up in the die area, forcing the shaping die out of adjustment and requiring peroxidic adjustments of the die over the same time period.

Prevex compositions 5, 6, 10 and 11, having ethylene bis stearamide (EBS) as the added processing aid, were subject to the same limitations as the Control A example in extrusion runs, producing substantial build-up in the die area. Additionally, the use of EBS will be seen in Examples 6 and 11 to produce a marked decrease in HDT values. Compositions containing EBS at these levels exhibited only marginal improvement in the metal plate sticking test described in Example 1, demonstrating that the use of an amide-type lubricant is ineffective in this application.

The instant invention will thus be seen to be a method for improving the processing characteristics of a PPE resin blend comprising a polyphenylene ether-high impact styrene comprising blending therewith from 0.01 to 1.0 parts by weight ethylene oxide-propylene oxide copolymer per hundred parts by weight of said PPE resin blend, and an improved PPE resin blend. The compositions of the foregoing examples are provided by way of illustration of the method and the improved compositions of this invention and not in limitation thereof, and the scope of this invention will be understood by those skilled in the art as defined by the appended claims.

I claim:

1. In a composition comprising a polyphenylene ether resin and a high impact polystryene, the improvement wherein an ethylene oxide-propylene oxide block copolymer is included in an amount effective to reduce adhesion to metals.

2. A phenylene ether resin composition consisting of 100 parts by weight of a blend comprising a polyphenylene ether and a high impact polystyrene and from 0.01 to 1.0 parts by weight of an ethylene oxide-propylene oxide block copolymer.

3. A method for reducing the adhesion of compositions comprising a polyphenylene ether resin and a high impact polystyrene resin to hot metal surfaces, said method consisting of the step of blending with said composition from 0.01 to 1.0 parts by weight of an ethylene oxide-propylene oxide block copolymer per hundred parts by weight of said composition.

* * * * *